United States Patent [19]
Fukuda et al.

[11] 3,847,603
[45] Nov. 12, 1974

[54] PROCESS FOR PREPARING A SINTERED IRON NEGATIVE PLATE FOR AN ALKALINE STORAGE BATTERY

[75] Inventors: Masataro Fukuda; Tsutomu Iwaki; Tadayasu Mitsumata, all of Osaka, Japan

[73] Assignee: Agency of Industrial Science and Technology, Tokyo, Japan

[22] Filed: Dec. 19, 1972

[21] Appl. No.: 316,543

[30] Foreign Application Priority Data
Apr. 3, 1972    Japan.............................. 47-32642
Dec. 28, 1971   Japan............................. 46-105736
Dec. 21, 1971   Japan............................. 46-103204

[52] U.S. Cl...................... 75/213, 75/214, 75/221, 75/224, 136/75
[51] Int. Cl.......... B22f 1/00, B22f 3/16, B22f 5/00
[58] Field of Search............. 29/182.5; 75/201, 221, 75/224, 211, 213, 206; 136/75

[56] References Cited
UNITED STATES PATENTS
3,640,772  2/1972  Falk et al......................... 136/75 X
3,317,347  5/1967  Coleman et al................... 136/75 X
3,261,715  7/1966  Solomon et al.................. 136/75 X
2,834,825  5/1958  Wenzelberger................... 136/75 X

*Primary Examiner*—Carl D. Quarforth
*Assistant Examiner*—R. E. Schafer

[57]  ABSTRACT

Needle-shaped oxygen-containing iron compound particles are heated in a first temperature range in a hydrogen atmosphere to produce a loosely tied sintered body, pulverized into finely divided particles of a predetermined size, tamped into a mould to a desired density so that the constituting needle-shaped iron particles are intertwined. The tamped mould is sintered at a second temperature range higher than the first temperature range to provide a desired porosity. Alternatively, oxygen-containing needle-like iron compound particles are initially mixed with oxygen-containing spherical iron compound particles prior to the process described above. The end product prevents disintegration of active material and provides an increased ampere-hour capacity.

10 Claims, 5 Drawing Figures

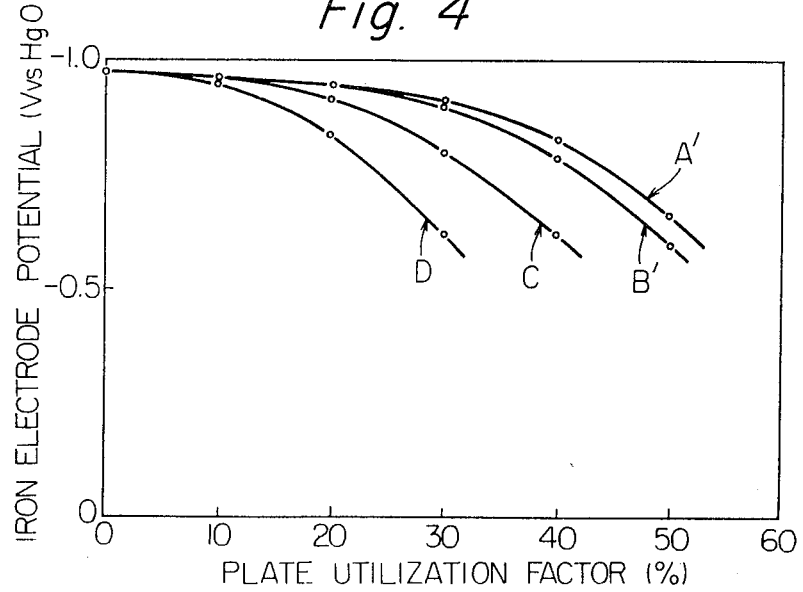
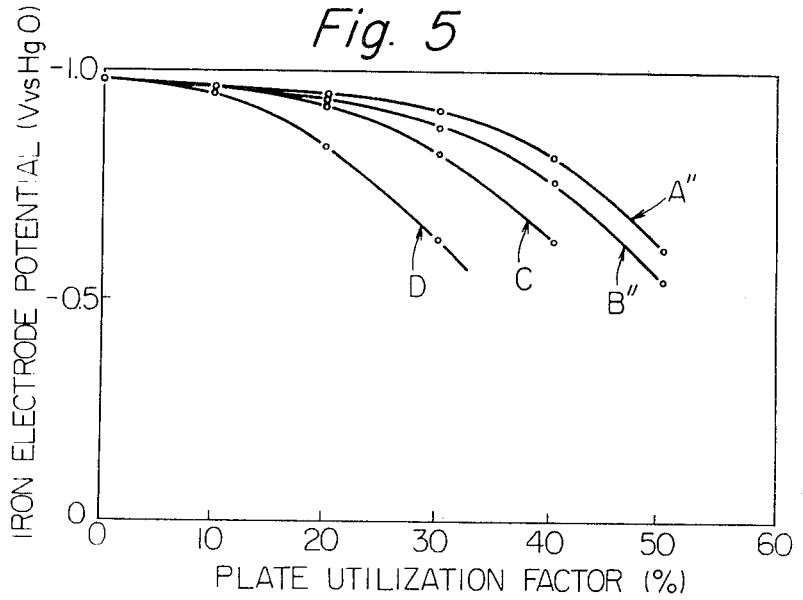

PROCESS FOR PREPARING A SINTERED IRON NEGATIVE PLATE FOR AN ALKALINE STORAGE BATTERY

This invention relates generally to the production of an iron negative electrode suitable for an alkaline storage battery, and particularly to a process for preparing a sintered iron negative electrode in which iron particles are intertwined and tied together to prevent disintegration of active metarial.

As power sources for electric automobiles and various portable equipments there is a growing need for rechargeable secondary batteries capable of providing efficient discharge and high ampere-hour output per unit weight. One prior art alkaline storage battery uses lithium or sodium as an active material of the negative electrode. Another prior art battery utilizes air as an active material for the positive electrode. In pursuit of an effective active material for the negative electrode of the alkaline storage battery, zinc has been investigated, but much remains to be solved because of its shortcomings in that a resinous precipitate would develop on charge, causing a short circuit of the battery. Iron negative electrodes are known in the art. Although the output voltage is less in magnitude that that of zinc electrodes, the iron negative electrode can provide greater ampere-hour capacity per unit weight with less solubility in an alkaline electrolyte solution, and therefore, there is less likelihood of resinous products being formed on the electrode plate surfaces during charge. Moreover, iron negative electrodes are less costly than prior art cadmium negative electrodes. The prior art pocket type iron negative electrode comprises finely divided iron particles disposed in a supporting plaque and compacted to a desired density.

One disadvantage of the pocket type iron negative electrode is that the electrode gives a high overall resistivity at the initial stage of discharge since the iron particles are merely compacted into the plaque and each particle is simply in mechanical contact with each other and thus good electrical contact is not provided between the particles, and that currents passing through one particle to another develop an electrically nonconductive reaction product between particles and thus each particle is electrically insulated from others and disintegration of active material would occur. This results in a high electrical resistivity of the battery and thus decreases overall efficiency of the battery.

It is accordingly an object of the present invention to provide an alkaline storage battery of high ampere-hour capacity per unit weight.

Another object of the present invention is to provide a method of providing a long usable life of the battery.

A further object of the present invention is to provide an alkaline storage battery capable of allowing quick charge.

A still further object of the invention is to provide a process for preparing an iron negative electrode plate for an alkaline storage battery, wherein needle-like sintered iron particles are intertwined to provide an integrally formed self-supporting structure.

These and other objects and advantages will be more clearly understood from the following description, taken in conjunction with the accompanying drawings, in which.

Figure 1:
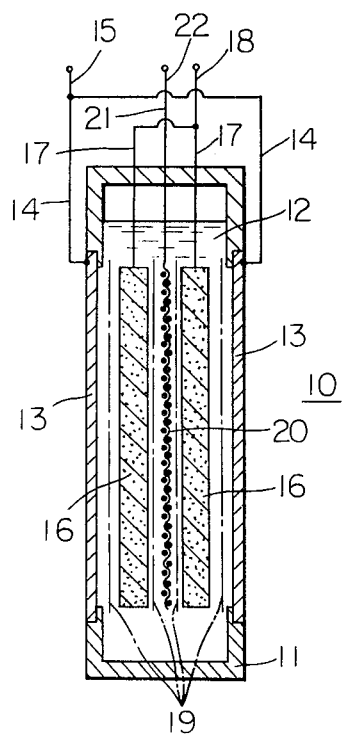
FIG. 1 is a cross-sectional view in elevation of an alkaline storage battery embodying iron negative electrode plates prepared in accordance with the present invention.

FIG. 4 is a characteristic diagram showing a plate utilization factor vs. iron electrode potential (vs. HgO) characteristics of an alkaline storage battery according to a second preferred method of the invention with corresponding characteristics of the conventional alkaline storage batteries; and FIG. 5 is a characteristic diagram showing a plate utilization factor vs. iron electrode potential (vs. HgO) characteristics of an alkaline storage battery according to a third preferred method of the present invention with corresponding characteristics of conventional alkaline storage batteries.

Briefly stated, in the practice of the present invention oxygen-containing iron compound particles of a needle-like crystalline structure are heated at a first temperature range in an atmosphere of hydrogen gas for reduction and sintering of the compound. The purpose of the sintering is to reduce electrical resistivity between the particles so as to keep the overall resistivity of the battery at minimum. During the heating iron compound particles are reduced and shrink to one-third to one-tenth of the original size and are loosely tied together to form a sintered body. The sintered body is pulverized into finely divided needle-like particles of a predetermined size and then tamped under a predetermined pressure into a mould of a desired shape suitable for a negative electrode plate. The tamping is for the production of an integral self-supporting structure in which the needle-shaped iron particles are intertwined and compacted to a desired density. This structure provides a large volume of interstices in proportion to the contacted areas between particles and thus serves to prevent disintegration of active material. The tamping process is followed by a sintering process wherein the tamped body is heated at a second temperature range higher than the first temperature range to provide a desired porosity.

An alternative method of preparing an iron negative electrode plate involves initially mixing oxygen-containing needle-like iron compound particles with oxygen-containing spherical iron compound particles which include commercially available iron compound powder. After the mixing, the process as described hereinabove is repeated to provide a similar end product in which spherical particles are entrapped in the interstices between needle-shaped particles.

It is to be noted that the iron compound particles are initially heated at a first temperature range, which is from 500°C to 1,000°C. If the temperature is below 500°C, reduction of the compound particles will take longer and sintered iron particles will be oxidized when handled in air and the tamped mould will considerably shrink during sintering at a second temperature so that a decreased porosity and an increased number of cracks will occur, thus rendering the end product useless. On the other hand, if the first temperature exceeds 1,000°C a difficulty will be encountered in pulverizing the sintered body into finely divided particles of a desired size and in obtaining a strong tamped body structure. Also, it it to be noted that if the plate thicknesses range from 3 mm to about 10 mm, porosities of 65 percent to 75 percent will be most suitable. If the porosity is below 65 percent, the plate utilization factor will decrease. If the porosity exceeds 75 percent, the required mechanical strength cannot be obtained and an overall charge-discharge efficiency will appreciably decrease. However, if the present embodiments are used in a nickel-iron alkaline storage battery, the plate thickness can be made thinner than 2 mm with a porosity of about 65 percent because of the battery construction in which the negative electrode plates are arranged alternately with the positive electrodes.

Referring now to FIG. 1 wherein an alkaline storage battery according to the present invention is indicated generally at numeral 10 and comprises a container 11 of polyvinyl chloride loaded with an electrolyte 12 of potassium hydroxide 30 percent by weight and potassium monosulphide 1 gram/liter. The container 11 is provided with air electrodes 13 formed of fluoride resin powder, the air electrodes being disposed on opposite side walls of the container. The air electrodes 13 are connected by lead wires 14 to a positive electrode terminal 15. In the container 11 two iron negative electrode plates 16 prepared in accordance with the present invention are disposed parallel to the surface of the air electrodes 13. The iron negative plates 16 are connected by lead wires 17 to a negative electrode terminal 18. Adjacent to but spaced from the opposite surfaces of the iron negative plates 16 are arranged separators 19 of nylon cloth. Between the centrally located separators 19 there is disposed an auxiliary electrode 20 formed, for example, of a 20-mesh screen of nickel wire 0.3 mm in diameter. The auxiliary electrode 20 is connected by a lead wire 21 to a terminal 22.

EXAMPLE 1

Alpha-type iron (III) oxyhydroxide ($\alpha$—FeOOH) particles about 5 microns long and about 0.5 microns wide are heated at a temperature range between 500°C and 1,000°C, preferably between 700°C and 850°C, in an atmosphere of hydrogen gas for at least 30 minutes to obtain a sintered body of iron particles. The sintered body is pulverized into finely divided particles, passed through a 32-mesh screen and tamped under a pressure of about 70 kg/cm² into a rectangular mould of 50mm × 60mm × 3.5mm. The tamped body is sintered at a temperature range between 700°C and 1,050°C, preferably at about 950°C in a hydrogen atmosphere for at least 20 minutes. For the purpose of comparison, the same process as described above is repeated except that alpha-type iron (III) oxyhydroxide particles about 1.5 microns long and about 0.5 microns wide are used.

Figure 2:
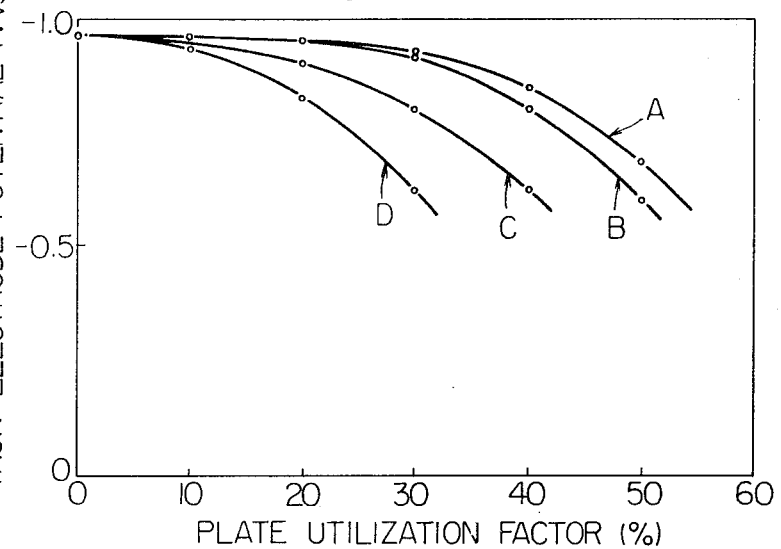
FIG. 2 is a characteristic diagram showing an electrode or plate utilization factor vs. iron electrode potential (vs HgO) characteristics of an alkaline storage battery according to a first preferred method of the invention, with corresponding characteristics of conventional alkaline storage batteries.
Figure 3:
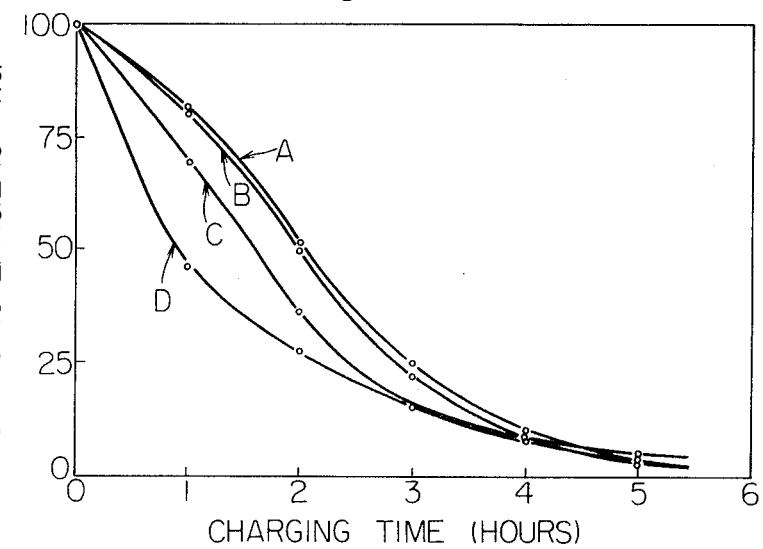
FIG. 3 is a characteristic diagram showing charging efficiency vs. charging time characteristics of the alkaline storage battery according to the first preferred method of the invention, with corresponding characteristics of the conventional alkaline storage batteries.

With these iron negative plates thus produced and disposed in an alkaline storage battery as shown in FIG. 1, the battery was subjected to a charge-discharge recycling test. The battery was recycled 20 times by discharging at a current density of 50 mA/cm² and charging at a current density of 70 mA/cm² to an extent twice that of ampere-hours discharged. Curve A of FIG. 2 shows a result of one embodiment comprising the use of long FeOOH particles while Curve B shows a result of the embodiment comprising the use of short FeOOH particles. Identical recycling tests were applied to alkaline storage batteries of the same construction using iron negative electrode plates of $\alpha$-type ferric oxide and electrolytic iron (below 350 mesh), the results of which are shown respectively in Curves C and D of FIG. 2. As will be apparent from FIG. 2 the present embodiment provides electrode or plate utilization factors of about 50 percent to 55 percent compared with alkaline storage batteries incorporating conventional spherical iron particles which yield plate utilization factors from 30 percent to 40 percent. The plate utilization factor is, in this specification, expressed as the proportion of active material in the entire amount of iron particles constituting an iron negative plate. Tests made at discharge current densities different from 50 mA/cm² have given substantially the same results as above. FIG. 3 illustrates charging efficiencies of the negative electrodes of the type as described above. The charging efficiency was determined by charging a pair of iron negative electrodes at a 9 ampere current after the above recycling test and by measuring the amount of hydrogen gas produced at the negative electrodes. As will be seen from FIG. 3 the present embodiments (Curves A and B) ensure quick charge due to their ability to be charged at a higher rate in the initial period than that in the later stage of the charging time. Curves C and D also correspond to $\alpha$-type ferric oxide and electrolytic iron particles, respectively. In relation to the long usable life of battery, a test revealed that the present embodiments have undergone a decrease of only about 5 percent in ampere-hour capacity after application 60 recycling tests which compares favorably with a decrease of about 10 percent with conventional electrodes after application of 30 to 60 recycling tests. While the above description has been concerned with $\alpha$-type FeOOH particles, the same results have been attained with the use of $\beta$-type and $\gamma$-type FeOOH particles.

EXAMPLE 2

Gamma-type ferric oxide ($\gamma$—Fe$_2$O$_3$) particles about 2 microns long and about 0.3 microns wide are heated at a temperature range between 500°C and 1,000°C, preferably between 700°C and 850°C, in an atmosphere of hydrogen gas for at least 30 minutes to obtain a loosely tied sintered body of iron particles. The sintered body is pulverized into finely divided particles, passed through a 32-mesh screen and tamped under a pressure of about 80 kg/cm² into a rectangular mould of 50mm × 60mm × 3.5mm. The tamped body is sintered at a temperature range between 700°C and 1,050°C, preferably at about 950°C in a hydrogen atmosphere for at least 20 minutes. For the purpose of comparison, the same process as described above is repeated except that $\gamma$-type ferric oxide particles about 1 micron long and about 0.5 microns wide are used. The end products thus prepared have an average porosity of 69 percent. The same recycling test as in Example 1 was applied to alkaline storage batteries incorporating the above embodiments and to the batteries of conventional type as tested in Example 1.

FIG. 4 shows plate utilization factors of the present embodiments (Curve A' shows long particles and Curve B' for short particles) and the conventional types (Curve C for α-type ferric oxide and Curve D for electrolytic iron particles). As apparent from FIG. 4, an iron negative electrode using longer particles exhibits better performance than that using iron particles of a shorter length. Test made at discharge current densities different from 50 mA/cm² have yielded the same results as described hereinabove. It was also shown that the present embodiments had undergone a decrease of about 5 percent in ampere-hour capacity after 60 recycling tests.

EXAMPLE 3

Spherical alpha-type ferric oxide particles of a size of about 0.2 microns in diameter are initially mixed with at least 5 percent by weight of needle-shaped alpha-type iron (III) oxyhydroxide (α-FeOOH) about 1 micron long and about 0.2 microns wide (mixture A). The mixture A is heated at a temperature range between 500°C and 1,000°C, preferably between 700°C and 900°C, and even more preferably at about 820°C in a hydrogen atmosphere for at least 30 minutes to obtain a sintered body of iron particles. The sintered body is pulverized into finely divided particles, passed through a 32-mesh screen, and tamped under a pressure of about 70 kg/cm² into a mould of 50mm × 60mm × 3.5mm. The tamped body is then sintered at a temperature range between 700°C and 1,050°C, preferably at about 950°C in a hydrogen atmosphere for at least 20 minutes. For the purpose of comparison, a mixture of spherical alpha-type ferric oxide particles of the same size as above and at least 5 percent by weight of needle-shaped gamma-type ferric oxide ($\gamma$-Fe$_2$O$_3$) particles about 1 micron long and about 0.1 microns wide (mixture B) is treated under the same process as described hereinabove. The same recycling test as in Example 1 was applied to alkaline storage batteries of the construction of FIG. 1 incorporating the present embodiments. Curves A'' and B'' of FIG. 5 show the results of the test applied to the embodiments of mixture A and mixture B, respectively, which compare favorably with Curves C and D for the batteries of the conventional types as in Example 1. It is found that the addition of at least 5 percent by weight of needle-shaped iron compound particles to spherical iron compound particles serves to improve the plate utilization factor of the iron negative electrode. Tests made at different values of discharge current density have yielded substantially the same results. As in Examples 1 and 2, ampere-hour capacity if the present embodiments have decreased only about 5 percent after application of 60 recycling tests.

While the above example was carried out by initially mixing two iron compounds of different shapes, a similar end result was obtained by initially heating the two compounds separately, pulverizing the sintered body in finely divided iron particles and mixing the two types of iron particles, and tamping the mixture into a desired shape and thereafter sintering the body at the second temperature range. This process, however, has yielded a result in which the electrode utilization factor has decreased about 3 percent to 5 percent compared with the pre-mixing process due to the fact that the reduction process prior to mixing appears to prevent needle-shaped particles from fully trapping spherical particles into the interstices between needle-shaped particles.

Similar results were obtained in another preferred process wherein the needle-shaped particles included β-type and γ-type FeOOH particles while the spherical particles included electrolytic iron particles and carbonyl iron particles. The preferable value of weight percentage of the mixed needle-shapd iron compound particles is at least 5 percent with the most preferable value being at 10 percent. It was also found that the preferable value of length-to-width ratio of needle-shaped iron compound particles was at least 3/1.

This invention in its broader aspects is not limited to the specific embodiments shown and described, but departures may be made from such embodiments within the scope of the accompanying claims without departing from the principles of the invention.

What is claimed is:

1. A method of preparing an iron negative plate for an alkaline storage battery, comprising the steps of:
   heating needle-shaped particles of an oxygen-containing iron compound selected from the group consisting of iron (III) oxyhydroxide and γ-type ferric oxide at a temperature range between 700°C and 850°C in hydrogen atmosphere to obtain a sintered body;
   pulverizing said sintered body into finely divided particles;
   tamping said finely divided particles into a mould of desired shape; and
   sintering said tamped body at a temperature range between 700°C and 1050°C in hydrogen atmosphere.

2. A method as claimed in claim 1 wherein said needle-shaped particles of an oxygen-containing iron compound are mixed with not more than 95 percent of spherical particles of α-type ferric oxide.

3. A method as claimed in claim 1 wherein said needle-shaped particles of oxygen-containing iron compound are mixed with not more than 95 percent of spherical iron particles.

4. A method as claimed in claim 3 wherein said spherical iron particles are electrolytic iron particles.

5. A method as claimed in claim 3 wherein said spherical iron particles are carbonyl iron particles.

6. A method as claimed in claim 1 wherein said finely divided particles are mixed with not more than 95 percent finely divided spherical iron particles before tamping.

7. A method of preparing an iron negative plate as claimed in claim 1, wherein said needle-shaped particles of oxygen-containing iron compound is heated in the hydrogen atmosphere for at least 30 minutes.

8. A method of preparing an iron negative plate as claimed in claim 1, wherein said tamped body is sintered for at least 20 minutes.

9. A method of preparing an iron negative plate as claimed in claim 1, wherein said needle-shaped particles of oxygen-containing iron compound particles have a length-to-width ratio of at least 3/1.

10. A method of preparing an iron negative plate as claimed in claim 1, wherein said finely divided particles have a size smaller than about 32 mesh.

* * * * *